(12) United States Patent
Matsumoto

(10) Patent No.: US 7,178,726 B2
(45) Date of Patent: Feb. 20, 2007

(54) METHOD AND SYSTEM FOR COLLECTING MARKET RESEARCH DATA FROM CONSUMERS

(75) Inventor: Hidehiro Matsumoto, Tokyo (JP)

(73) Assignee: Nec Corporation, Tokyo (JP)

( * ) Notice: Subject to any disclaimer, the term of this patent is extended or adjusted under 35 U.S.C. 154(b) by 1147 days.

(21) Appl. No.: 09/954,170

(22) Filed: Sep. 18, 2001

(65) Prior Publication Data

US 2002/0035503 A1    Mar. 21, 2002

(30) Foreign Application Priority Data

Sep. 19, 2000    (JP)    ............................. 2000-284013

(51) Int. Cl.
| G06K 15/00 | (2006.01) |
| G06F 19/00 | (2006.01) |
| G06F 17/30 | (2006.01) |
| G06Q 30/00 | (2006.01) |
| G06Q 90/00 | (2006.01) |

(52) U.S. Cl. ........................ 235/383; 235/385; 705/10; 701/208; 701/213

(58) Field of Classification Search ................ 235/383, 235/385
See application file for complete search history.

(56) References Cited

U.S. PATENT DOCUMENTS

| 5,805,078 | A | * | 9/1998 | Sugiyama et al. | ..... | 340/825.52 |
| 5,979,757 | A | * | 11/1999 | Tracy et al. | ................ | 235/383 |
| 6,608,556 | B2 | * | 8/2003 | De Moerloose et al. | .... | 340/501 |
| 6,611,751 | B2 | * | 8/2003 | Warren | ....................... | 701/200 |
| 6,625,457 | B1 | * | 9/2003 | Raith | ...................... | 455/456.1 |
| 6,647,269 | B2 | * | 11/2003 | Hendrey et al. | ......... | 455/456.3 |
| 6,731,238 | B2 | * | 5/2004 | Johnson | .................. | 342/357.09 |
| 6,789,102 | B2 | * | 9/2004 | Gotou et al. | ................ | 709/203 |
| 6,795,710 | B1 | * | 9/2004 | Creemer | .................. | 455/456.3 |
| 6,836,667 | B1 | * | 12/2004 | Smith, Jr. | ................ | 455/456.1 |
| 7,085,555 | B2 | * | 8/2006 | Zellner et al. | ........... | 455/414.1 |
| 2001/0025248 | A1 | * | 9/2001 | Nihei | ............................ | 705/7 |
| 2002/0077130 | A1 | * | 6/2002 | Owensby | ..................... | 455/466 |
| 2002/0156578 | A1 | * | 10/2002 | Kondou et al. | ............. | 701/213 |
| 2002/0198851 | A1 | * | 12/2002 | Hashimoto et al. | ......... | 705/400 |
| 2003/0018524 | A1 | * | 1/2003 | Fishman et al. | .............. | 705/14 |
| 2003/0097374 | A1 | * | 5/2003 | Himeno | .................... | 707/104.1 |

(Continued)

FOREIGN PATENT DOCUMENTS

JP    2000-209197    7/2000

Primary Examiner—Uyen-Chau N. Le
Assistant Examiner—Daniel Walsh
(74) Attorney, Agent, or Firm—Foley & Lardner LLP

(57) ABSTRACT

For collecting market research data and promoting business activities in a selected geographic area, user information containing users' profile and preference information is received from a mobile terminal and a user identifier is assigned to the user of the mobile terminal, The assigned user identifier is mapped to the received user information in a first database, and the assigned user identifier is transmitted to the mobile terminal. A user identifier, when received from a mobile terminal, is checked for verification. If the received user identifier is verified, the user of this mobile terminal is allowed to transmit area-specific information that can obtained only when the user is in the selected geographic area. Corresponding to the verified user identifier, user information in the first database is detected and mapped to the received area-specific information in a second database. Data stored in the second database can be used for market research.

50 Claims, 5 Drawing Sheets

U.S. PATENT DOCUMENTS

| | | | |
|---|---|---|---|
| 2003/0148763 A1* | 8/2003 | Kikuchi | 455/433 |
| 2004/0002897 A1* | 1/2004 | Vishik | 705/14 |
| 2004/0098308 A1* | 5/2004 | Okano | 705/14 |
| 2004/0140353 A1* | 7/2004 | Ishizuka | 235/383 |
| 2004/0181450 A1* | 9/2004 | Yamada et al. | 705/14 |
| 2004/0243519 A1* | 12/2004 | Perttila et al. | 705/75 |
| 2005/0096043 A1* | 5/2005 | Haberman et al. | 455/422.1 |
| 2005/0133595 A1* | 6/2005 | Tanase | 235/383 |
| 2005/0154629 A1* | 7/2005 | Matsuda et al. | 705/10 |
| 2005/0192008 A1* | 9/2005 | Desai et al. | 455/435.2 |
| 2005/0228719 A1* | 10/2005 | Roberts et al. | 705/14 |
| 2005/0239495 A1* | 10/2005 | Bayne | 455/550.1 |
| 2005/0255861 A1* | 11/2005 | Wilson et al. | 455/456.2 |
| 2006/0015503 A1* | 1/2006 | Simons et al. | 707/10 |
| 2006/0041474 A1* | 2/2006 | Westling et al. | 705/14 |
| 2006/0094428 A1* | 5/2006 | Jou | 455/435.1 |

* cited by examiner

FIRST DATABASE MAINTAINED BY SERVER 4

| USER IDENTIFIER | EXP. DATE | USER INFORMATION |
|---|---|---|
| -------- | -------- | -------- |
| | | |

SECOND DATABASE MAINTAINED BY SERVER 5

| SHOP CODE | USER PREFERENCE INFO. | DATE | TIME-OF-DAY |
|---|---|---|---|
| -------- | -------- | -------- | -------- |
| | | | |

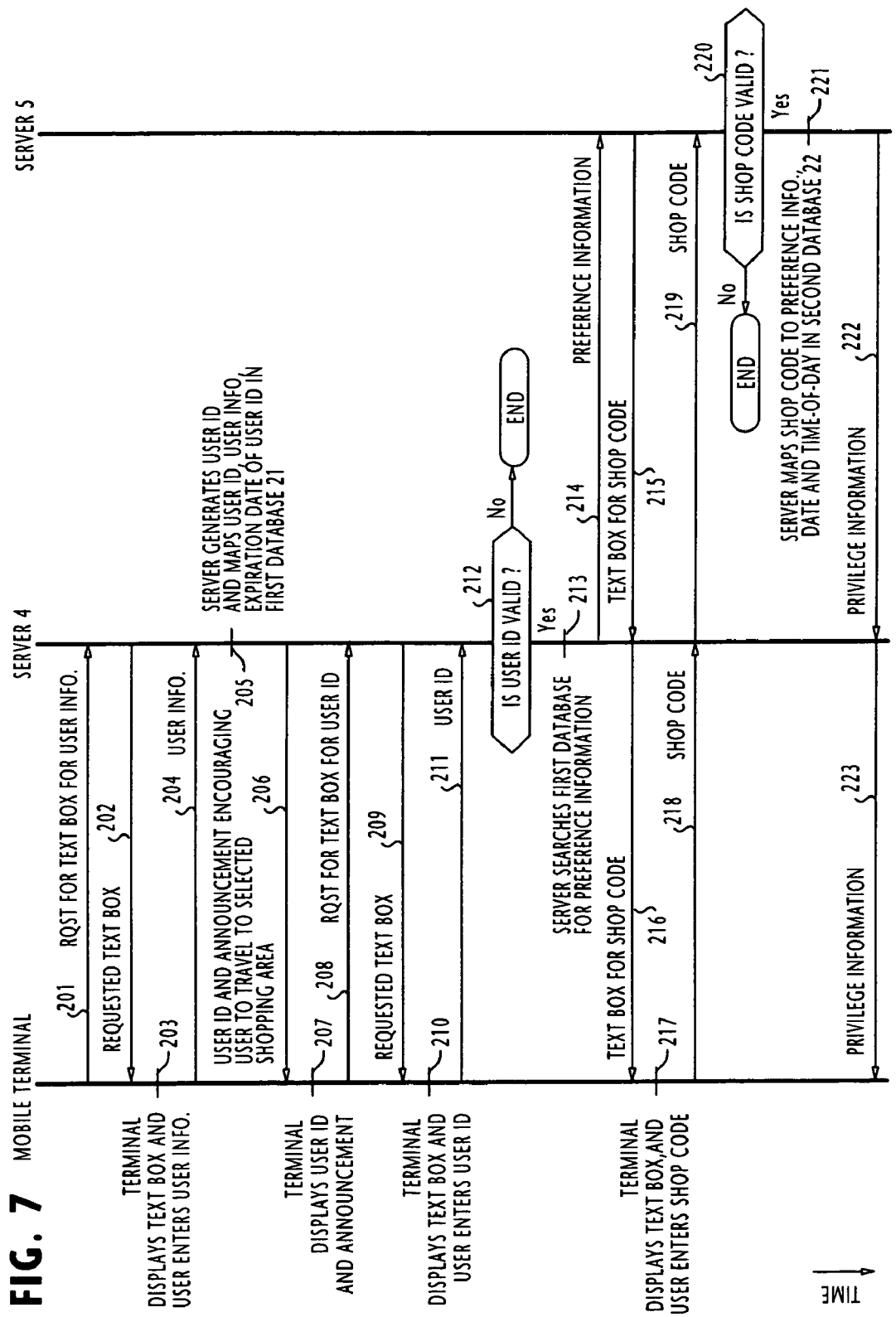

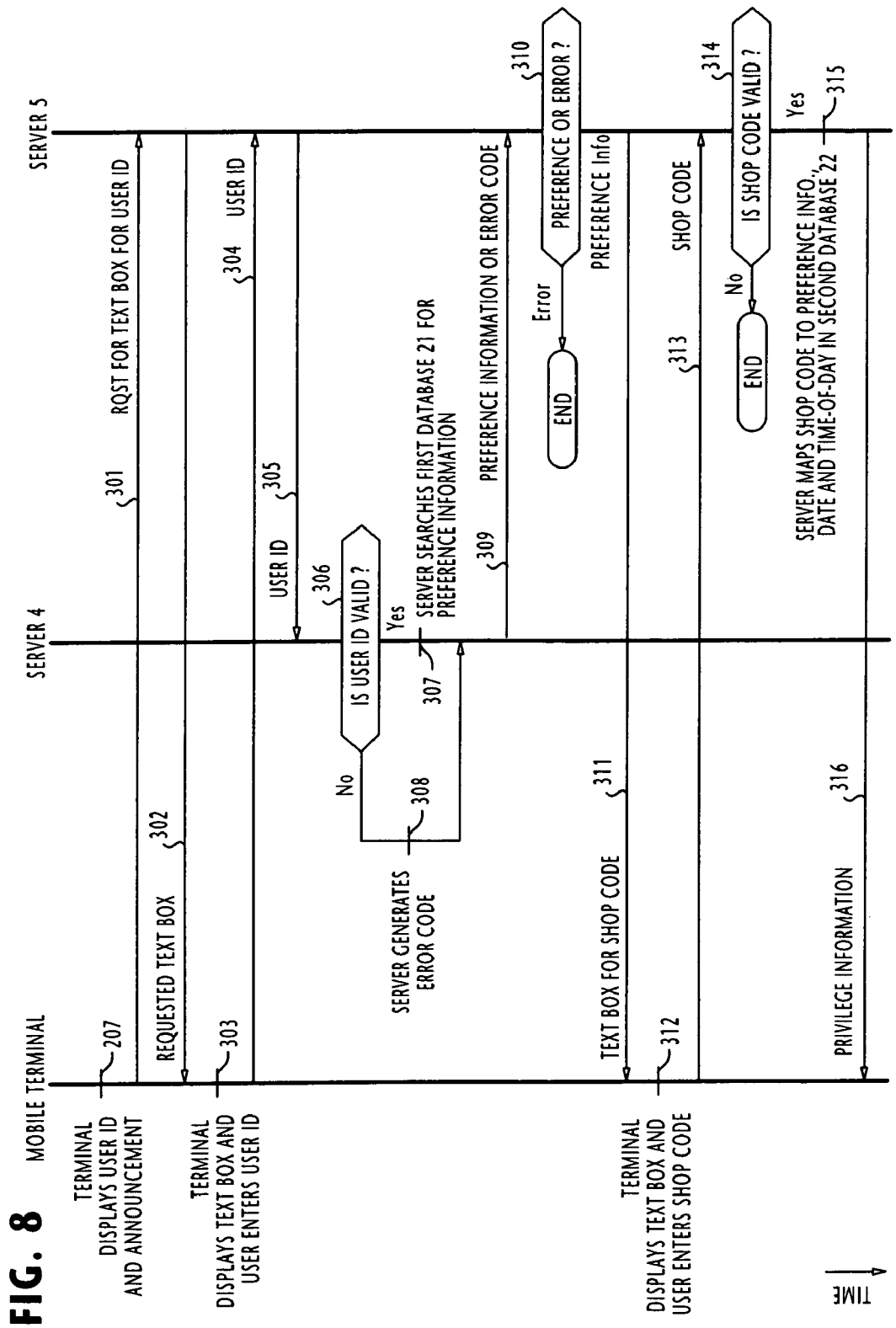

METHOD AND SYSTEM FOR COLLECTING MARKET RESEARCH DATA FROM CONSUMERS

BACKGROUND OF THE INVENTION

1. Field of the Invention

The present invention relates to a market research system for enabling market researchers to collect information about users' preferences from mobile terminals through a communications network.

2. Description of the Related Art

Since recent advances in the communications technology allow low-cost transmission of information to users, there is an increasing number of advertising agencies acting as information providers for transmitting sales information via the Internet to users and collecting data from the users for market researchers to study users' preferences. Further, recent proliferation of mobile terminals which communicate with WWW servers using TCP/IP, HTTP or WAP allows users to establish an instant access to various information resources.

However, most of the commercial mails currently transmitted over the Internet are directed to unspecified destinations. This is undesirable for network utilization as well as for recipients who reluctantly receive them as undesired mails. There exists a need to reduce wasteful mail transmissions by identifying target destinations.

SUMMARY OF THE INVENTION

It is therefore an object of the present invention to provide a method and system for collecting market research data from consumers that indicate their preferences and interests in a particular geographic area or market.

Another object of the present invention is to provide a market research data collecting method and system that is conducive to promote business activities of a particular geographic area, According to a first aspect of the present invention, there is provided a data collecting method comprising the steps of (a) receiving user information from a mobile terminal of a user and assigning a user identifier to the user, (b) mapping the assigned user identifier to the received user information in a first database, (c) transmitting the assigned user identifier to the mobile terminal (d) receiving a user identifier from a mobile terminal of a user and checking the user identifier for verification, (e) allowing the user to transmit area-specific information if the user identifier is verified and receiving the transmitted area-specific information, wherein the area-specific information is obtainable only if the user is in the area, (f) detecting user information in the first database corresponding to the verified user identifier, and (g) mapping the received area-specific information to the detected user information in a second database.

According to a second aspect the present invention provides a data collecting method comprising the steps of (a) receiving, at a first server, user information from a mobile terminal of a user and assigning a user identifier to the user, the user information comprising profile information which identifies the mobile terminal and preference information which cannot identify the mobile terminal, (b) creating, at the first server, a first database in which the assigned user identifier is mapped to the received user information, (c) transmitting the assigned user identifier to the mobile terminal from the first server, (d) receiving, at the first server, a user identifier from a mobile terminal of a user and checking the user identifier for verification, (e) if the user identifier is verified, detecting preference information in the first database corresponding to the verified user identifier, (f) receiving, at a second server, the detected preference information from the first server, (g) allowing the user to transmit area-specific information if the user identifier is verified and receiving, at the first server, the transmitted area-specific information, wherein the area-specific information is obtainable only if the user is in the area, (h) receiving, at the second server, the area-specific information from the first server, and (i) creating, at the second server, a second database in which the received area-specific information is mapped to the received preference information.

According to a third aspect the present invention provides a data collecting method comprising the steps of (a) receiving, at a first server, user information from a mobile terminal of a user and assigning a user identifier to the user, the user information comprising profile information which can identify the mobile terminal and preference information which cannot identify the mobile terminal, (b) creating, at the first server, a first database in which the assigned user identifier is mapped to the received user information, (c) transmitting the assigned user identifier to the user from the first server, (d) receiving, at a second server, a user identifier from a mobile terminal of a user, (e) receiving, at the first server, the user identifier from the second server and checking the received user identifier for verification, (f) if the user identifier is verified, detecting preference information in the first database corresponding to the verified user identifier, (g) receiving, at the second server, the detected preference information from the first server, (h) allowing the user to transmit area-specific information and receiving, at the second server, the transmitted area-specific information, wherein the area-specific information is obtainable only if the user is in the area, and (i) creating, at the second server, a second database in which the received area-specific information is mapped to the received preference information.

Privilege information may be transmitted to the mobile terminal when the second database is created. Data stored in the second database is useful for studying customer's preferences in the selected geographic area,

BRIEF DESCRIPTION OF THE DRAWINGS

The present invention will be described in detail further with reference to the following drawings, in which:

FIG. 7 is a sequence diagram of a first form of the operation of the system of FIG. 4; and FIG. 8 is a sequence diagram of a second form of the operation of the system of FIG. 4.

DETAILED DESCRIPTION

Figure 1:
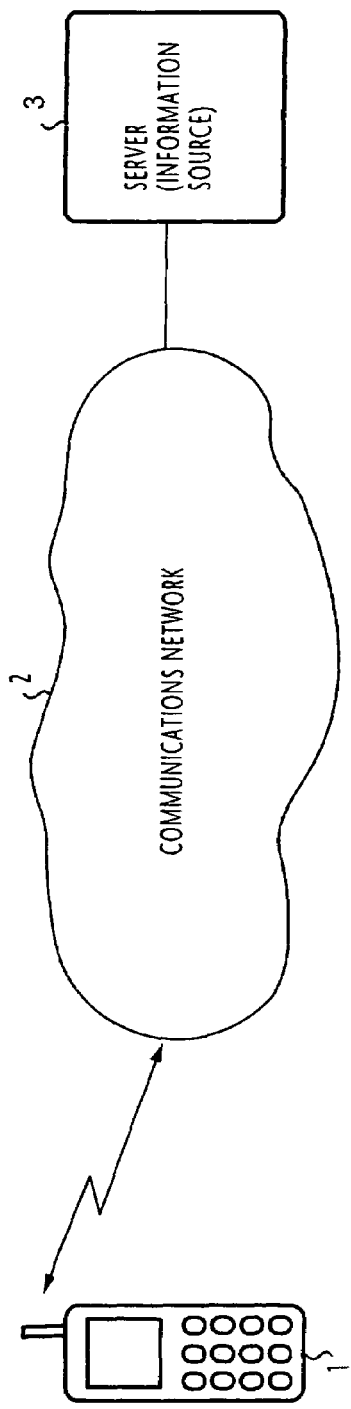
FIG. 1 is a block diagram of a market data collection system according to a first embodiment of the present invention.

In FIG. 1, a data collection system for market research according to a first embodiment of the present invention is illustrated in simplified form in which only one mobile terminal 1 is shown for simplicity. Mobile terminal 1 may be a cellular phone or a personal digital assistant for establishing a wireless link through a mobile network to the Internet 2 to which a server 3 of an information provider (source) is connected. Server 3 maintains sales database holding sales data of a number of fashionable shopping areas.

Figure 2:
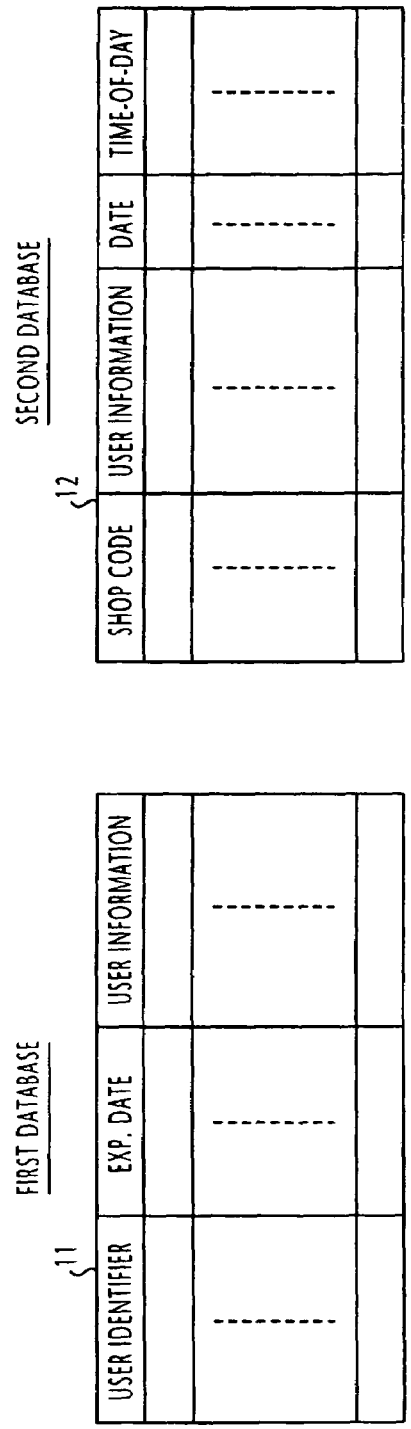
FIG. 2 shows details of databases created in the server of FIG. 1.

As will be described in detail later, the server 3 creates in its storage device a first database 11, as shown in FIG. 2, for mapping a plurality of user identifiers with their expiration dates to a corresponding number of user information and a second database 12 for mapping a plurality of shop codes to a corresponding number of user information, the dates and time-of-day at which the shop codes are received from mobile terminals.

Mobile terminal 1 has a keypad for allowing the user to enter alphanumeric data and a display panel for providing a display of the entered data and screen data received from the server including a text box. Mobile terminal 1 is equipped with a WWW (world wide web) browser for displaying an electronic registration form received from the server for allowing the user to enter response data requested from the server. Server 3 may be any of conventional personal computer systems operating on a UNIX or LINUX OS program on which a WWW server program and HTTPD (hypertext transfer protocol daemon) and CGI (common gateway interface) programs are run, According to the present invention, a market research user program is installed on the terminal device 1 and a market research server program is installed on the server 3. Both of these market research programs operate according to a sequence diagram shown in FIG. 3.

Figure 3:
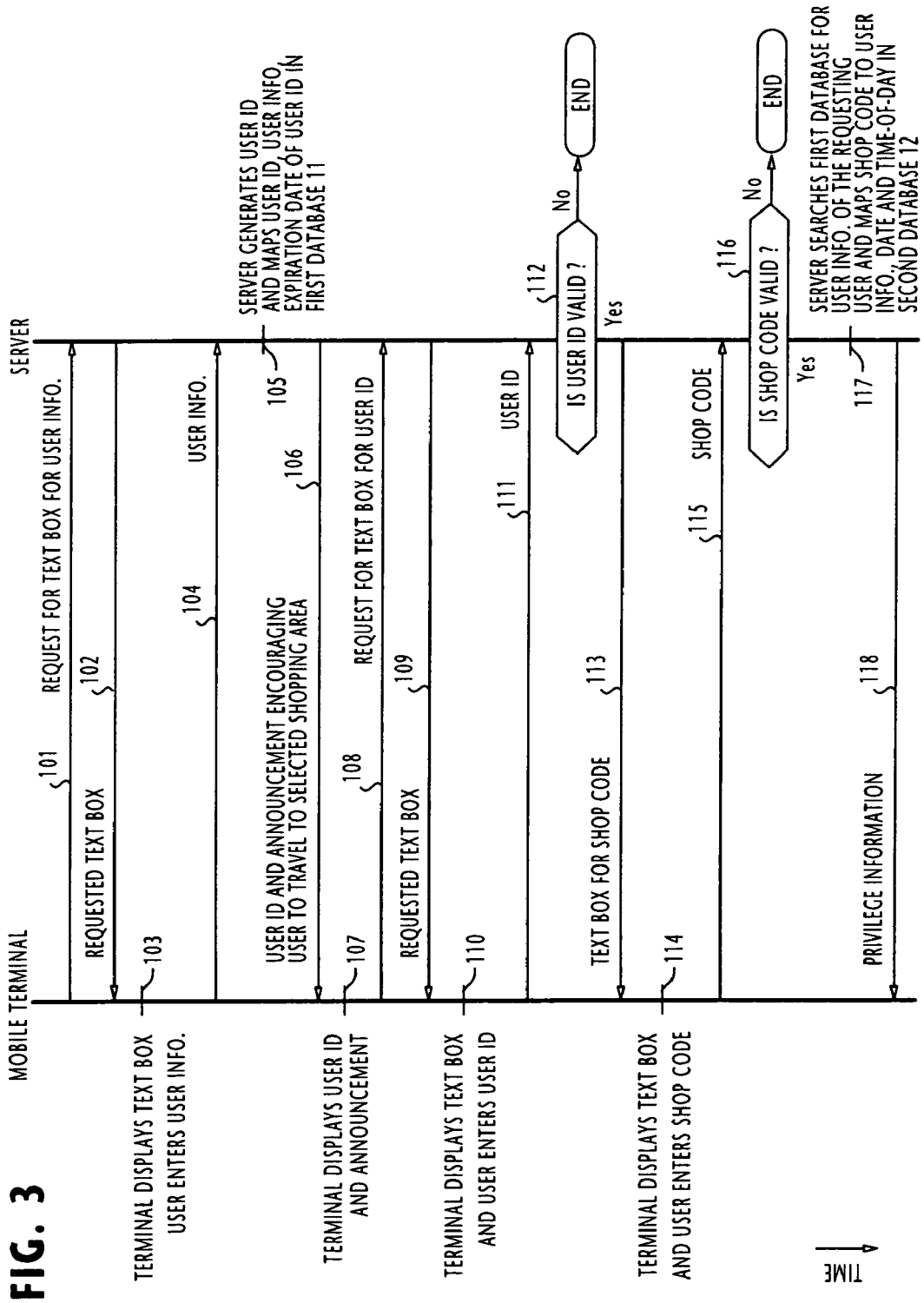
FIG. 3 is a sequence diagram of the operation of the system of FIG. 1.

Referring to FIG. 3, the operation of the market research system proceeds as follows:

When the user of the mobile terminal 1 initially establishes a connection to the server 3, he sends a request for a text box indicating a plurality of shopping areas (or geographic markets) to be selected by the user. Tis is done by sending a URI (uniform resource indicator) identifying a text box (or HTML form) for entering user information or a URI identifying a program for displaying such a text box. In response, the server 3 transmits the requested text box containing a list of shopping areas to be selected by the user. The transmitted text box is displayed on the mobile terminal and the user selects one of the listed shopping areas. The filled-in text box is transmitted to the server 3.

Following the transmission of the text box specifying a shopping area (geographic market), the mobile terminal 1 sends a request to the server 3 for a text box for the user to enter user information (step 101). The user information consists of profile information and preference information, The profile information includes a device number identifying the mobile terminal, a telephone number assigned to the mobile terminal, the type of system with which the user is charged from the serving common carrier, the user's name and postal address, and Fe type of bearer service, The preference information includes the user's sex, age, residential area, hobbies, family, academic career, business career and subscribed magazines. Therefore, the profile information can be used to identify the mobile terminal while the preference information cannot.

In response, the server 3 transmits the requested text box containing blank fields to the mobile terminal 1 (step 102).

The transmitted text box is received and displayed on the mobile terminal 1 and the user enters user information into fields of the displayed text box (step 103). The filled-in user information text box is then submitted to the server 3 (step 104).

In response to receipt of the user information, the server 3 produces a user identifier for uniquely identifying the user and maps the user identifier and its expiration date to the received user information in the first database 11 (step 105). Server 3 sends the user identifier to the mobile terminal 1 along with an announcement encouraging the user to travel to the selected shopping area where he can obtain desired sales items and bargains (step 106).

The transmitted user identifier and announcement are displayed on the mobile terminal 1 and stored in memory (step 107). Being encouraged by the displayed announcement, the user may proceed to travel to the selected shopping area.

If the user is in the selected shopping area, posters or placards advertising sales items and area-specific information such as shop codes will attract the attention of the user. The posters also notify expiration dates of the shop codes. After reading the advertisements, the user may enter shop codes and their expiration dates to the mobile terminal 1. For purposes of managing the shop codes and their expiration dates, the information source server 3 maintains a shop-code database.

Alternatively, short-range wireless communication systems such as Bluetooth may be used to broadcast sales items and shop codes from individual shops of the particular shopping area. In this system, the mobile terminal 1 is also provided with a Bluetooth system, which is activated when the user is in the selected shopping area to receive and store the broadcast shop codes in the mobile terminal.

When the user enters the selected shopping area, he sends a request to the server to obtain a text box for entering the previously received user identifier (step 108). In response, the server 3 returns the requested text box (step 109).

The transmitted text box is displayed on the mobile terminal and the user enters his own user identifier and its expiration date in the displayed text box (step 110), which is then submitted to the server 3 (step 111).

Upon receipt of the user identifier, the server 3 checks it for validity by comparing it with those stored in the ID database and examining its expiration date (step 112). If the user identifier is valid, the server 3 sends a text box for the user to enter a shop code (step 113). Otherwise, the process is terminated and the user is informed of this fact.

The transmitted text box is displayed on the mobile terminal and the user enters a shop code in the displayed text box (step 114), which is then submitted to the server (step 115).

Server 3 checks the received shop code for validity by consulting with the shop-code database for a match. If they match, the expiration date of the shop code is expand for verification (step 116). If the shop code is valid, the server determines that the user is in a specified shopping area and makes a search through the database for user information corresponding to the received user identifier and maps the received shop code to the user information, date and time-of-day in the second database 12 (step 117), Server 3 transmits privilege information indicating bargain sales items (step 118). The user may display the transmitted privilege information and allow it to be seen by the sales attendant of the shop of interest. The displayed privilege information of a shop may be saved in memory and retrieved at a later time and shown to the sales attendant of the shop, The market researcher analyses the stored shop codes and user information to determine current sales trends which indicate relationships between types of people and their interests on different sales items. The stored data itself or the analyzed results can be sold to advertising agencies.

In the previous embodiment, consumers' profile information are stored in the server of the market researcher. For security it is desirable to prevent the market researcher from gaining access to the profile information.

Figures 4, 5, 6:
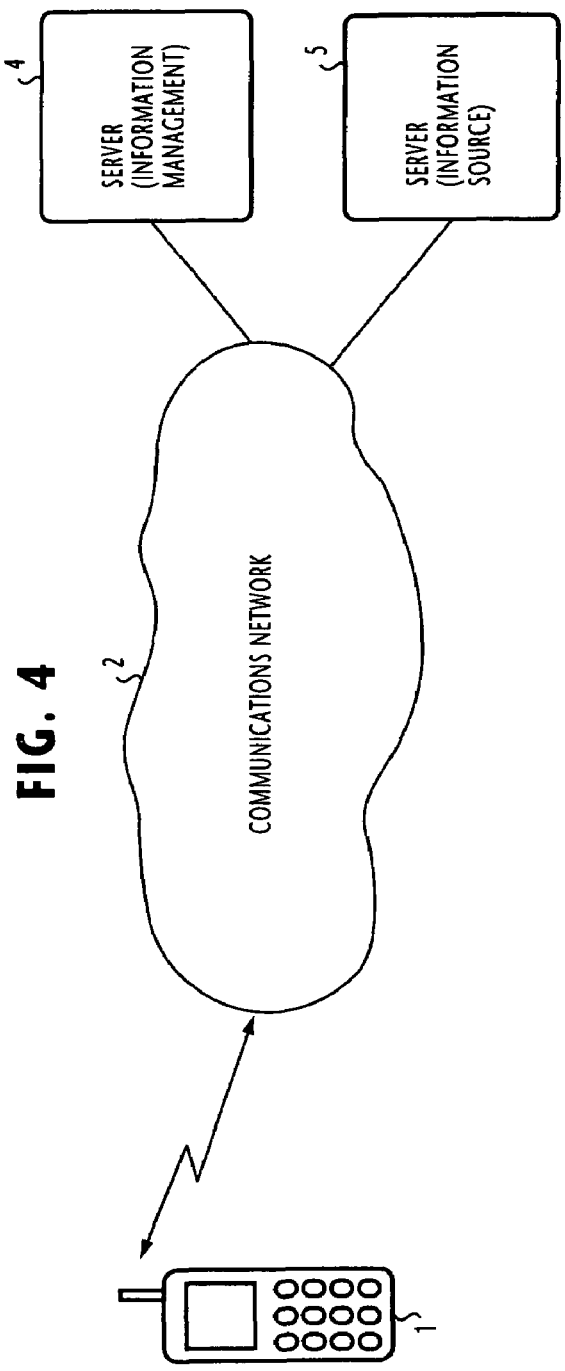
FIG. 4 is a block diagram of a market data collection system according to a second embodiment of the present invention.
FIG. 5 shows details of a database created in a first server of FIG. 4.
FIG. 6 shows details of a database created in a second server of FIG. 4.

To this end, two servers 4 and 5 are provided in a second embodiment of the present invention as shown in FIG. 4. Server 4 is an information management server which is controlled by an information management system to hold both profile and preference information. Specifically, the server 4 creates a first database 21, as shown in FIG. 5, in which it maps a plurality of user identifiers with their expiration dates to a plurality of user information in a manner similar to the first embodiment. On the other hand, the server 5 is an information source server maintained by a local information provider and is used to exclusively hold user preference information for a particular shopping area. The information source server 5 holds a second database 22 for mapping a plurality of shop codes to a corresponding number of user preference information, dates and time-of-day at which the shop codes are received from mobile terminals, as shown in FIG. 6. In a practical aspect, a plurality of such information source servers 5 may be connected to the information management server 4. Communications between the mobile terminal 1 and the information collection system is by way of the information management server 4.

A first form of the operation of the system of FIG. 4 is described with reference to a sequence diagram shown in FIG. 7.

After the user selects a desired shopping area in a manner as described above, the operation of FIG. 7 starts with the mobile terminal 1 transmitting a request to the information management server 4 for requesting a text box for the user to enter both profile and preference information (step 201). In response, the server 4 transmits the requested text box containing blank fields to the mobile terminal 1 (step 202).

The transmitted text box is displayed on the mobile terminal 1 and the user enters user information into the displayed text box (step 203) and transmits the filled-in user information text box to the server 4 (step 204).

In response to receipt of the user information, the server 4 generates a user identifier for uniquely identifying the user and maps the user identifier with its expiration date to the received user information in the first database 21 (step 205). Server 4 sends the user identifier to the mobile terminal 1 along with an announcement for encouraging the user to make a trip to a selected shopping area where he can obtain desired sales items and bargains (step 206).

The transmitted user identifier and announcement are displayed on the mobile terminal 1 (step 207). Being encouraged by the displayed announcement, the user may proceed to make a trip to the selected shopping area.

Similar to the previous embodiment, if the user is in the selected shopping area, the user's attention may be attracted to posters advertising sales items with shop codes as in the previous embodiment and the user may store shop codes of interesting shops in the storage device of mobile terminal 1. The posters also notify expiration dates of the shop codes. The shop codes and their expiration dates are managed in a shop-code database maintained by the information source server 5.

The user now sends a request to the server to obtain a text box for entering the previously received user identifier (step 208). In response, the server 3 returns the requested text box (step 209).

The transmitted text box is displayed on the mobile terminal and the user enters his own user identifier and its expiration date in the displayed text box (step 210), which is then submitted to the server 4 (step 211).

Upon receipt of the user identifier, the server 4 checks it for validity by comparing it with those stored in the ID database and examining its expiration date (step 212). If the user identifier is not valid, the server 4 terminates the process and informs the user of this fact. If the user identifier is valid, the server 4 makes a search through the database to detect preference information that corresponds to the received user identifier (step 213) and sends the detected preference information to the information source server 5 (step 214).

Upon receipt of the transmitted preference information, the server 5 stores it in a storage device and transmits a text box to the information management server 4 in order that the user may enter a shop code (step 215). Information management server 4 receives the text box from the server 5 and retransmits it to the mobile terminal 1 (step 216).

The transmitted text box is received by the mobile terminal and displayed and the user enters a desired shop code in the displayed text box (step 217), which is then submitted to the server 4 (step 218). Server 4 retransmits the shop-code containing text box to the information source server 5 (step 219). Server 5 checks the received shop code for validity by comparing it with registered shop codes for a match. If they match, the expiration date of the shop code is examined for verification (step 220). If the shop code is valid, the server 5 determines that the user is in a specified shopping area and maps the verified shop code to the preference information of the user, date and time-of-day at which the shop code is received in the second database 22 (step 221).

Information source server 5 transmits privilege information to the information management server 4 (step 222). This information is received by and retransmitted from the server 4 to the mobile terminal 1 for indicating bargain sales items and the like (step 223). The data stored in the server 5 is then analyzed by a market researcher to determine sales trends. In this way, illegal access to the sensitive user profile information from local information providers can be prevented.

The speed of communications between the mobile terminal 1 and the information source server 5 can be increased by establishing direct paths between them, rather than through the information management server 4.

For this purpose, a modification of the sequence diagram of FIG. 7 is shown in FIG. 8.

The transaction steps of FIG. 8 during the initial period of the system operation are identical to those of FIG. 4 until the user travels and enters the selected shopping area after he is encouraged by the displayed announcement (step 207).

The user sends a request to the information source server 5 to obtain a text box for entering the previously received user identifier (step 301). In response, the server 5 returns the requested text box (step 302).

The transmitted text box is displayed on the mobile terminal and the user enters his own user identifier and its expiration date in the displayed text box (step 303), which is then submitted to the server 5 (step 304).

The user identifier is retransmitted from the information source server 5 to the information management server 4 (step 305), where the user identifier is compared with those stored in the ID database and its expiration date is examined to deter its validity (step 306). If the user identifier is valid, the server 4 makes a search through the database to detect preference information that corresponds to the received user identifier (step 307). If the user identifier is not valid, the server 4 generates an error code (step 308). To the server 5, the server 4 sends preference information if the decision at step 306 is affirmative or an error code otherwise.

Server 5 determines whether preference information or an error code is received from the server 4. If an error code is received, the server 5 terminates the transaction and informs this fact to the user. If preference information is received, the server 5 sends to the mobile terminal 1 a text box for the user to enter a shop code (step 311).

The transmitted text box is displayed on the mobile terminal and the user enters a desired shop code in the displayed text box (step 312), which is then submitted to the server 5 (step 313). Server 5 checks the received shop code for validity in the same manner as described above (step 314). If the shop code is valid, the server 5 determines that the user is in a specified shopping area and maps the verified shop code to the preference information of the user, date and time-of-day in its storage device (step 315) and transmits privilege information to the information management server 4 (step 316).

what is claimed is:

1. A data collecting method comprising the steps of:
   a) receiving user information from a mobile terminal of a user and assigning a user identifier to the user;
   b) mapping the assigned user identifier to the received user information in a first database;
   c) transmitting the assigned user identifier to said mobile terminal;
   d) receiving a user identifier from a mobile terminal of a user and checking the user identifier for verification;
   e) allowing the user to transmit area-specific information if said user identifier is verified and receiving the transmitted area-specific information, wherein said area-specific information is obtainable only if said user is in said area;
   f) detecting user information in said first database corresponding to the verified user identifier; and
   g) mapping the received area-specific information to the detected user information in a second database.

2. The data collecting method of claim 1, wherein step (e) further comprises the step of verifying the received area-specific information.

3. The data collecting method of claim 2, wherein the verifying step comprises determining whether the area-specific information is received within a specified time interval.

4. The data collecting method of claim 1, wherein step (g) further comprises the step of mapping the received area-specific information to calendar date on which the area-specific information is received from the mobile terminal.

5. The data collecting method of claim 4, wherein step (g) further comprises the step of mapping the received area-specific information to time-of-day at which the area-specific information is received from the mobile terminal.

6. The data collecting method of claim 1, further comprising the step of transmitting an announcement to said mobile terminal for encouraging the user to travel to said geographic area.

7. The data collecting method of claim 1, wherein said user information comprises profile information necessary for a communications network to identify the mobile terminal of said user and preference information of said user which cannot identify said user.

8. The data collecting method of claim 7, wherein said profile information and said preference information are stored in a server maintained by a single organization.

9. The data collecting method of claim 7, wherein said profile information is stored in a first server and said preference information is stored in a second server, said first and second servers being respectively maintained by different organizations.

10. The data collecting method of claim 1, wherein step (g) further comprises the step of transmitting privilege information to said mobile terminal.

11. The data collecting method of claim 1, wherein said mobile terminal receives said area-specific information over a wireless link from a sales terminal when said user is in said selected geographic area.

12. A data collecting method comprising the steps of:
    a) receiving, at a first server, user information from a mobile terminal of a user and assigning a user identifier to the user, said user information comprising profile information which identifies said mobile terminal and preference information which cannot identify said mobile terminal;
    b) creating, at said first server, a first database in which the assigned user identifier is mapped to the received user information;
    c) transmitting the assigned user identifier to said mobile terminal from said first server;
    d) receiving, at said first server, a user identifier from a mobile terminal of a user and checking the user identifier for verification;
    e) if the user identifier is verified, detecting preference information in said first database corresponding to the verified user identifier;
    f) receiving, at a second server, the detected preference information from the first server;
    g) allowing the user to transmit area-specific information if said user identifier is verified and receiving, at said first server, the transmitted area-specific information, wherein said area-specific information is obtainable only if said user is in said area;
    h) receiving, at said second server, the area-specific information from said first server; and
    i) creating, at said second server, a second database in which the received area-specific information is mapped to the received preference information.

13. The data collecting method of claim 12, wherein step (h) further comprises the step of verifying the received area-specific information.

14. The data collecting method of claim 13, wherein the verifying step comprises determining whether the area-specific information is received within a specified time interval.

15. The data collecting method of claim 12, wherein step (I) further comprises the step of mapping the received area-specific information to calendar date on which the area-specific information is received from the mobile terminal.

16. The data collecting method of claim 15, wherein step (i) further comprises the step of mapping the received area-specific information to time-of-day at which the area-specific information is received from the mobile terminal.

17. The data collecting method of claim 12, further comprising the step of transmitting an announcement to said mobile terminal for encouraging the user to travel to said geographic area.

18. The data collecting method of claim 12, wherein step (i) further comprises the step of transmitting privilege information to said mobile terminal.

19. The data collecting method of claim 12, wherein said mobile terminal receives said area-specific information over a wireless link from a sales terminal when said user is in said selected geographic area.

20. A data collecting method comprising the steps of:
a) receiving, at a first server, user information from a mobile terminal of a user and assigning a user identifier to the user, said user information comprising profile information which can identify said mobile terminal and preference information which cannot identify said mobile terminal;
b) creating, at said first server, a first database in which the assigned user identifier is mapped to the received user information;
c) transmitting the assigned user identifier to said user from said first server;
d) receiving, at a second server, a user identifier from a mobile terminal of a user;
e) receiving, at said first server, the user identifier from said second server and checking the received user identifier for verification;
f) if the user identifier is verified, detecting preference information in said first database corresponding to the verified user identifier;
g) receiving, at said second server, the detected preference information from the first server;
h) allowing the user to transmit area-specific information and receiving, at said second server, the transmitted area-specific information, wherein said area-specific information is obtainable only if said user is in said area; and
i) creating, at said second server, a second database in which the received area-specific information is mapped to the received preference information.

21. The data collecting method of claim 20, wherein step (h) further comprises the step of verifying the received area-specific information.

22. The data collecting method of claim 21, wherein the verifying step comprises determining whether the area-specific information is received within a specified time interval.

23. The data collecting method of claim 20, wherein step (i) further comprises the step of mapping the received area-specific information to calendar date on which the area-specific information is received from the mobile terminal.

24. The data collecting method of claim 23, wherein step (i) further comprises the step of mapping the received area-specific information to time-of-day at which the area-specific information is received from said mobile terminal.

25. The data collecting method of claim 20, further comprising the step of transmitting an announcement to said mobile terminal for encouraging the user to travel to said geographic area.

26. The data collecting method of claim 20, wherein step (i) further comprises the step of transmitting privilege information to said mobile terminal.

27. The data collecting method of claim 20, wherein said mobile terminal receives said area-specific information over a wireless link from a sales terminal when said user is in said selected geographic area.

28. A server comprising the functions of:
receiving user information from a mobile terminal of a user through a communications network and assigning a user identifier to the user;
creating a first database in which the assigned user identifier is mapped to the received user information;
transmitting the assigned user identifier to said mobile terminal through said network;
receiving a user identifier from a mobile terminal of a user through said network and checking the user identifier for verification;
allowing the user to transmit area-specific information from the mobile terminal if said user identifier is verified and receiving the transmitted area-specific information through said network, wherein said area-specific information is obtainable only if said user is in said area;
detecting user information in said first database corresponding to the verified user identifier; and
creating a second database in which the received area-specific information is mapped to the detected user information.

29. The server of claim 28, wherein the function of receiving the area-specific information comprises the function of verifying the received area-specific information.

30. The server of claim 29, wherein the verifying function comprises determining whether the area-specific information is received within a specified time interval.

31. The server of claim 28, wherein the function of creating the second database further comprises mapping the received area-specific information to calendar date on which the area-specific information is received from the mobile terminal.

32. The server of claim 31, wherein the function of creating the second database further comprises mapping the received area-specific information to time-of-day at which the area-specific information is received from the mobile terminal.

33. The server of claim 28, further comprising the function of transmitting an announcement to said mobile terminal for encouraging the user to travel to said geographic area.

34. The server of claim 28, further comprising the function of transmitting privilege information to said mobile terminal when said second database is created.

35. A system for collecting data for market research, comprising:
a mobile terminal of a user;
a first server connected to a communications network; and
a second server connected to said communications network,
said first server receiving user information including profile information which identifies said mobile terminal and preference information which cannot identify said mobile terminal from the mobile terminal, assigning a user identifier to the user of the mobile terminal, creating a first database in which the assigned user identifier is mapped to the received user information, transmitting the assigned user identifier to said mobile terminal, receiving a user identifier and checking the received user identifier for verification, and detecting preference information in said first database corresponding to the received user identifier if the received user identifier is verified,
said second server receiving the detected preference information from the first server, allowing the mobile terminal to transmit area-specific information through said first server, receiving the transmitted area-specific information through said first server, and creating a second database in which the received area-specific information is mapped to the received preference information, wherein said area-specific information is obtainable only if said user is in said area.

36. The system of claim 35, wherein said second server verifies the received area-specific information.

37. The system of claim 36, wherein said second server verifies the area-specific information if the area-specific information is received within a specified time interval.

38. The system of claim 35, wherein said second server maps the received area-specific information to calendar date on which the area-specific information is received from the mobile terminal.

39. The system of claim 38, wherein said second server further maps the received area-specific information to time-of-day at which the area-specific information is received from the mobile terminal.

40. The system of claim 35, wherein said first server transmits an announcement to said mobile terminal for encouraging the user to travel to said geographic area.

41. The system of claim 35, wherein the mobile terminal receives said area-specific information over a wireless link from a sales terminal when said user is in said specified geographic area.

42. The system of claim 35, wherein the second server transmits privilege information to said mobile terminal when said second database is created.

43. A system for collecting data for market research, comprising:
a mobile terminal of a user;
a first server connected to a communications network; and
a second server connected to said communications network,
said first server receiving from said mobile terminal user information including profile information which can identify a mobile terminal of said user and preference information which cannot identify the mobile terminal, assigning a user identifier to the user, creating a first database in which the assigned user identifier is mapped to the received user information, transmitting the assigned user identifier to said mobile terminal,
said second server receiving a user identifier from a user;
said first server receiving the user identifier from said second server, checking the received user identifier for verification, detecting preference information in said first database corresponding to the received user identifier if the received user identifier is verified,
said second server receiving the detected preference information from the first server, allowing the user to transmit area-specific information, receiving the transmitted area-specific information, and creating a second database in which the received area-specific information is mapped to the received preference information, wherein said area-specific information is obtainable only if said user is in said area.

44. The system of claim 43, wherein said second server verifies the received area-specific information.

45. The system of claim 44, wherein said second server determines whether the area-specific information is received within a specified time interval for verification.

46. The system of claim 43, wherein said second server further comprises maps the received area-specific information to calendar date on which the area-specific information is received from the mobile terminal.

47. The system of claim 46, wherein said second server further maps the received area-specific information to time-of-day at which the area-specific information is received from the mobile terminal.

48. The system of claim 43, wherein the first server transmits an announcement to said mobile terminal for encouraging the user to travel to said geographic area.

49. The system of claim 43, wherein the mobile terminal receives said area-specific information over a wireless link from a sales terminal when said user is in said specified geographic area.

50. The system of claim 43, wherein the second server transmits privilege information to said mobile terminal when said second database is created.

* * * * *

UNITED STATES PATENT AND TRADEMARK OFFICE
CERTIFICATE OF CORRECTION

PATENT NO. : 7,178,726 B2 Page 1 of 1
APPLICATION NO. : 09/954170
DATED : February 20, 2007
INVENTOR(S) : Hidehiro Matsumoto It is certified that error appears in the above-identified patent and that said Letters Patent is hereby corrected as shown below:

On the title page, item; [73] should read:

(73) Assignee: NEC Corporation instead of Nec Corporation.

Signed and Sealed this

Fourth Day of December, 2007

JON W. DUDAS
*Director of the United States Patent and Trademark Office*